March 28, 1961 F. P. MASON ET AL 2,977,179

FACSIMILE APPARATUS

Filed March 20, 1959

*Inventor*

F.P.Mason-R.G.Stemp

*By*

*Attorney*

United States Patent Office 2,977,179

Patented Mar. 28, 1961

2,977,179

FACSIMILE APPARATUS

Frederick Percival Mason and Ronald Gilbert Stemp, Croydon, England, assignors to Creed & Company Limited, Croydon, England, a British company Filed Mar. 20, 1959, Ser. No. 800,878

Claims priority, application Great Britain Apr. 3, 1958

4 Claims. (Cl. 346—138)

This invention relates to facsimile apparatus.

In known facsimile apparatus of the drum type, it is necessary for an operator to manipulate some message-holding device on the drum before facsimile operation begins, so that a message sheet or a recording sheet is attached to the drum, and then for the operator to manipulate the message-holding device at the end of facsimile operation to release the message sheet or recording sheet.

It is an object of the present invention to simplify this procedure.

According to the present invention there is provided facsimile apparatus comprising gripping means for holding a message sheet during scanning by a scanning system, means for producing relative motion between the scanning system and the message sheet during scanning thereof, and means operative upon the return of the scanning system and the message sheet to an initial relationship for causing the gripping means to release the message sheet.

The term "scanning" as used herein denotes either scanning for transmission, for example by an optical system, or a similar movement by a stylus or other recording instrument. Similarly, the term "message sheet" is to denote either one having information thereon for transmission or a blank to be used for recording.

Figure 1:
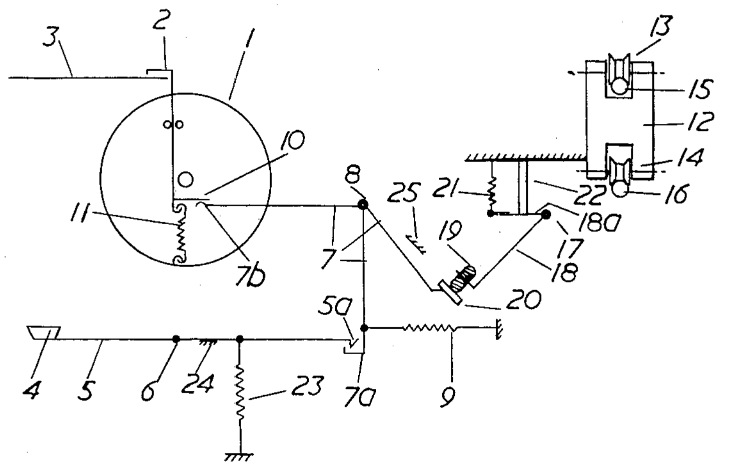
Figure 2:
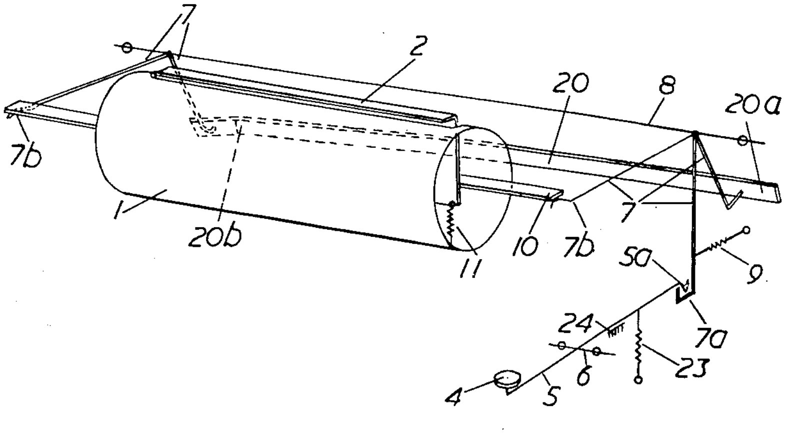

One embodiment of the invention will now be described in detail with reference to the accompanying drawings, in which:

Fig. 1 shows diagrammatically a side view of the relevant portions of a facsimile transceiver incorporating the present invention, and Fig. 2 is a diagrammatic perspective view of some of the apparatus shown in Fig. 1.

Referring to the drawings, there is shown a hollow cylindrical drum 1 having an L-shaped jaw or clip 2, projecting through a slot in the drum surface. The jaw 2 is spring-urged towards the surface of the drum 1 by a spring 11, but in the rest position of the apparatus this movement is prevented by a pair of abutment faces **7*b* which engage an extension 10 mounted on the jaw 2**.

The abutment faces **7*b* are mounted on respective frames 7 which are pivotable about an axis 8. The frame 7 shown in Fig. 1 and on the right in Fig. 2 consists of three arms, one which carries the abutment face 7*b*, a second which carries a projection 7*a*, and a third which is attached to a bar 20. The frame 7 shown on the left in Fig. 2 has two arms only, one carrying the second abutment face 7*b* and the other being attached to the bar 20. The two frames 7 are therefore ganged together by the bar 20, which is at an angle to the axis of the drum 1 as shown in Fig. 2 and has its extremity 20*b* at an even greater angle to the axis than the rest of the bar 20**.

The frame 7 shown on the right in Fig. 2 is spring-urged anticlockwise about the axis 8 by a spring 9 which acts on the arm of the frame 7 which carries the projection **7*a*. In the rest position of the apparatus this movement is prevented by a latch 5*a* mounted on one end of a lever 5 which is pivoted at a pivot 6 and maintained in the position shown in contact with a stop 24 by a spring 23. At the other end of the lever 5 there is a button 4**.

Referring to Fig. 1 only there is shown a scanning carriage 12, which carries the optical scanning system and the marking device of the transceiver. The scanning carriage 12 is provided with grooved rollers 13 and 14, so that it may travel on rails 15 and 16 in a path parallel to the axis of the drum 1. The scanning carriage 12 also carries a pivot 17 on which there are mounted two connected arms 18 and **18*a*. The arm 18 carries a roller 19, which in the rest position of the apparatus is beyond the end 20*a* (Fig. 2) of the bar 20 and therefore not in contact with the bar 20. The arm 18*a* (Fig. 1) is kept in a rest position in contact with a stop 22 by a spring 21**.

When facsimile operation is to be started, the operator places one edge of a message form or recording sheet 3 between the jaw 2 and the drum 1 as shown in Fig. 1. He then presses the button 4 downwards, thus rocking the lever 5 anti-clockwise about the pivot 6 so that the latch **5*a* moves upwards out of engagement with the projection 7*a* on the frame 7. The frame 7 is then free to pivot anticlockwise (as seen in Fig. 1) about the axis 8 under the action of spring 9, which it does until the arm of the frame 7 attached to the bar 20 comes into contact with a stop 25. Both the frames 7 and the bar 20 joining them are therefore moved when the button 4 is pressed, with the result that the two abutment faces 7*b* are moved downwards. It is arranged that the abutment faces 7*b* are moved further than the clip or jaw 2 can move under the action of spring 11 before it is arrested by the surface of the drum 1 against which it holds the message form 3. The abutment faces 7*b* are therefore no longer in contact with the extension 10**.

The message form 3 is now gripped between the jaw 2 and the drum 1 and will be drawn repeatedly through a cylindrical path for scanning to take place when the drum 1 rotates clockwise. When the operator releases the button 4, the lever 5 moves back into the rest position shown in Fig. 1, but the projection **7*a* of the frame 7 is not now in a position to be engaged by the latch 5*a***.

When rotation of the drum 1 begins, the scanning carriage 12 starts to move on the rails 15 and 16 in well known manner. The scanning carriage 12, which is not shown in Fig. 2, will move from right to left across that figure. As it does so the roller 19 will pass underneath the extremity **20*a* of the bar 20. As the scanning carriage 12 continues its leftward movement, the roller 19 comes into contact with the lower surface of the bar 20 and is gradually depressed, rocking the arms 18 and 18*a* anticlockwise (Fig. 1) about the pivot 17 against the tension of the spring 21**.

When the scanning carriage 12 is completing its travel leftwards (in Fig. 2), the roller 19 moves out of engagement with the extremity **20*b* of the bar 20, whereupon the spring 21 contracts and rocks the arms 18 and 18*a* clockwise (as seen in Fig. 1) about the pivot 17 until the arm 18*a* is again in contact with the stop 22**.

When scanning is complete, the scanning carriage 12 is restored to its normal position either automatically or manually by the operator pushing it from the left to the right of Fig. 2. During this movement the roller 19 will pass over the extremity **20*b* of the bar 20 and will come into contact with the upper surface of the bar 20. The roller 19 and the arms 18, 18*a* cannot be moved clockwise, however, because of the stop 22, so the bar 20 moves and progressively rocks the frames 7 clockwise (as seen in Fig. 1) about the axis 8. The abutment faces 7b are therefore brought back into contact with the extension 10 mounted on the jaw or clip 2 and lift the jaw 2 to release the message form 3. In the course of this action the projection 7a of the right-hand frame 7 passes the latch 5a and momentarily rocks the lever 5 anti-clockwise as it is re-engaged by the latch 5a**.

Just before the end of the return movement of the scanning carriage 12, the roller 19 passes out of engagement with the extremity 20a of the bar 20, which will then tend to rise under the action of the spring 9, but will be prevented from doing so by the projection 7a of the frame 7 being engaged by the latch 5a. The jaw or clip 2 therefore remains supported in the open position as shown.

While the principles of the invention have been described above in connection with specific embodiments, and particular modifications thereof, it is to be clearly understood that this description is made only by way of example and not as a limitation on the scope of the invention.

What we claim is:

1. Facsimile apparatus comprising a rotatable drum, gripping means mounted on the drum for holding the leading edge of a message sheet during a scanning operation, said gripping means comprising a jaw and spring means urging the jaw towards the axis of the drum to grip the message sheet, a scanning system and means for moving it relative to the drum during a scanning operation, a bar pivotable about an axis parallel to the direction of movement of the scanning system and disposed at an angle to the said axis, roller means movable with said scanning system, said roller means pivoting the bar about the said axis during the movement of the scanning system to an initial position, and means associated with the said bar for moving the jaw against the action of the spring means when the bar is pivoted about the said axis for operating the said gripping means to release the said message sheet.

2. Facsimile apparatus as claimed in claim 1, in which the extremity of the said bar further from the initial position of the scanning system is at an even greater angle to the said axis than the rest of the bar.

3. Facsimile apparatus as set forth in claim 1 wherein said jaw is an L-shaped jaw projecting through a slot in the drum surface.

4. Facsimile apparatus as set forth in claim 1 further comprising latch means for holding the said bar in the position to which the roller has caused the bar to pivot as the scanning system nears the said initial position, and means operable to cause the latch means to release the bar to enable the jaw to grip another message sheet.

References Cited in the file of this patent

UNITED STATES PATENTS

| | | |
|---|---|---|
| 2,365,741 | Wise et al. | Dec. 26, 1944 |
| 2,666,808 | Cooley | Jan. 19, 1954 |